United States Patent

Stenger et al.

[15] 3,653,207
[45] Apr. 4, 1972

[54] HIGH FUEL INJECTION DENSITY COMBUSTION CHAMBER FOR A GAS TURBINE ENGINE

[72] Inventors: Richard E. Stenger; Clifford C. Gleason, both of Cincinnati, Ohio

[73] Assignee: General Electric Company

[22] Filed: July 8, 1970

[21] Appl. No.: 53,146

[52] U.S. Cl. ............................ 60/39.65, 60/39.72 R, 60/39.74 R, 431/353
[51] Int. Cl. .................................................. F02c 3/24
[58] Field of Search .......................... 60/39.65, 39.72, 39.74; 431/350–353

[56] References Cited

UNITED STATES PATENTS

| | | | |
|---|---|---|---|
| 2,867,982 | 1/1959 | Clarke | 60/39.69 |
| 2,959,006 | 11/1960 | Ferrie | 60/39.74 |
| 2,996,884 | 8/1961 | Johnson | 60/39.65 |
| 3,132,483 | 5/1964 | Lefebvre | 60/39.65 |
| 3,267,676 | 8/1966 | Sneeden | 60/39.74 |

*Primary Examiner*—Douglas Hart
*Attorney*—Derek P. Lawrence, Thomas J. Bird, Jr., Lee H. Sachs, Frank L. Neuhauser, Oscar B. Waddell and Joseph B. Forman

[57] ABSTRACT

A combustion chamber for a gas turbine engine is disclosed as having a high density, i.e., greater number than normal, of fuel injection and flame stabilization points. Additionally, a dome passageway is sized to receive and deliver directly to the combustion zone, as primary air flow, a much higher percent of total compressor discharge air at a much higher velocity than in prior art combustors of the same approximate size. A baffle is positioned transversely of the primary air passage to define the upstream end of the combustion zone and to define the fuel injection and flame stabilization points. Combining the above features results in a highly efficient, smoke free combustor having a shortened primary combustion zone.

8 Claims, 6 Drawing Figures

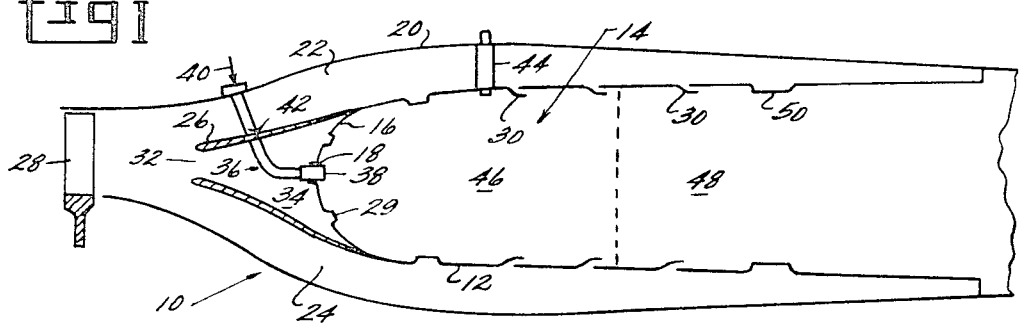
Fig 1 — PRIOR ART
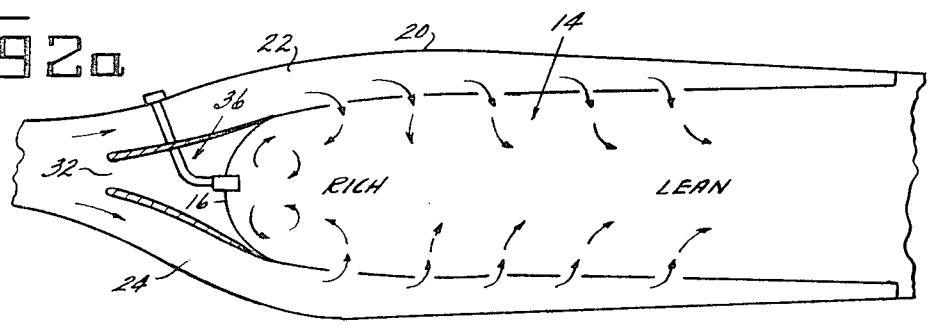
Fig 2a — PRIOR ART
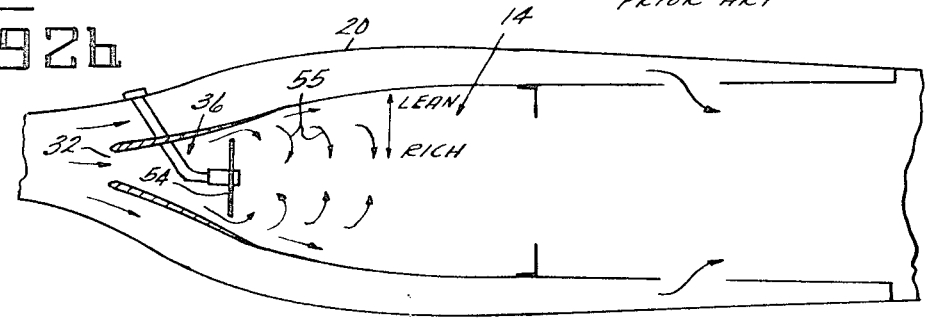
Fig 2b — PRIOR ART
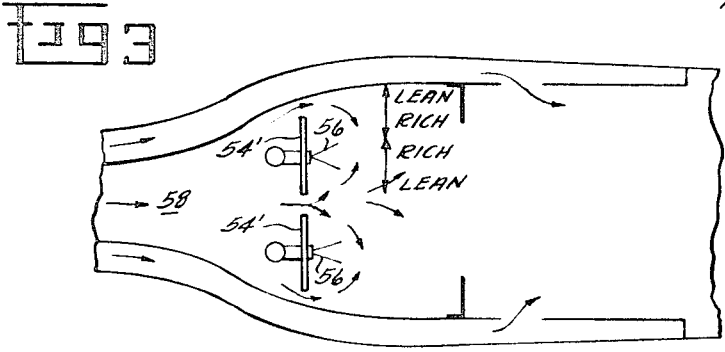
Fig 3
INVENTORS.
RICHARD E. STENGER
CLIFFORD C. GLEASON
Thomas J. Bird, Jr.
AGENT—

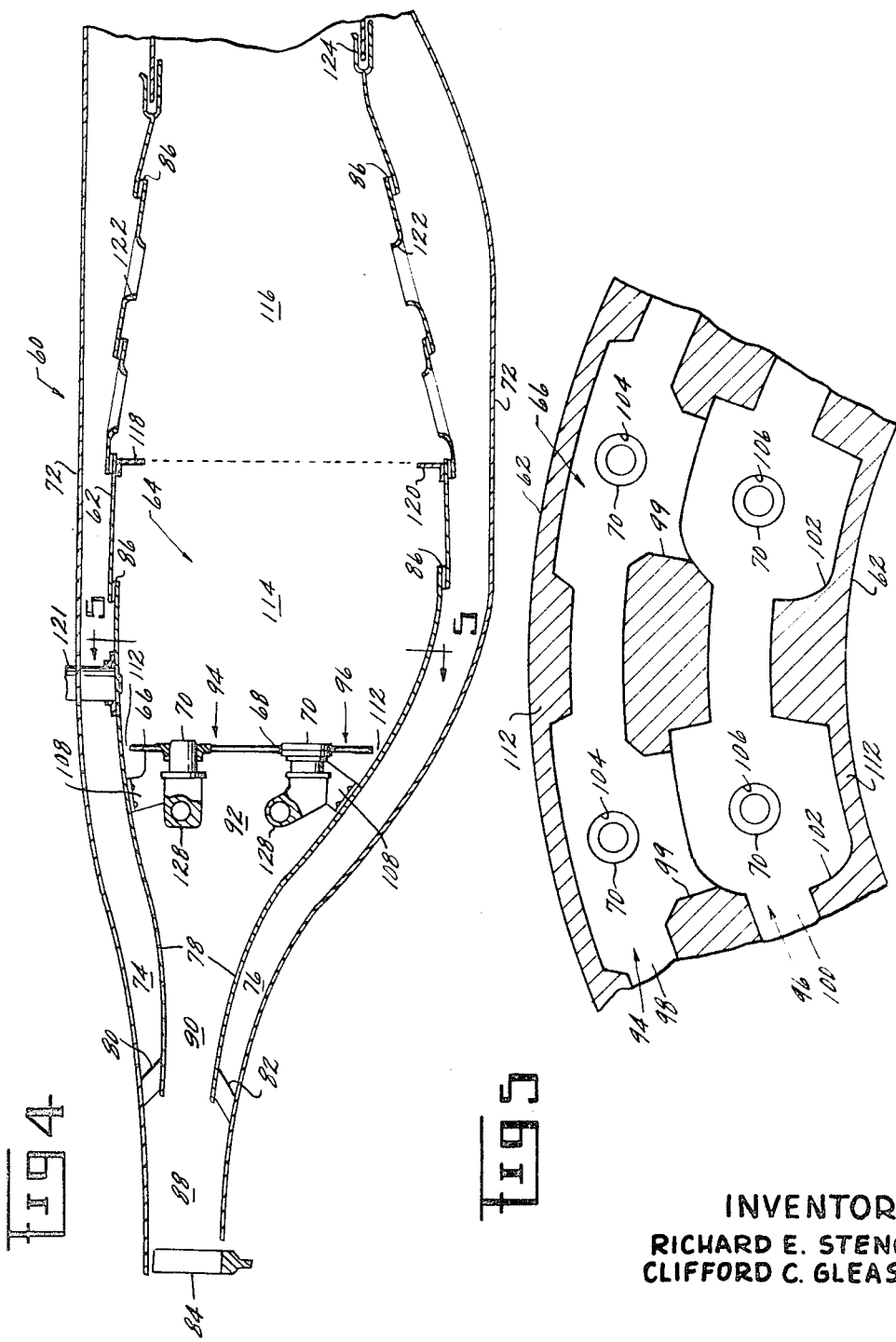

HIGH FUEL INJECTION DENSITY COMBUSTION CHAMBER FOR A GAS TURBINE ENGINE

BACKGROUND OF THE INVENTION

This invention relates generally to combustion chambers for gas turbine engines and, more particularly, to a combustion chamber which utilizes high fuel injection density (a large number of fuel injection and flame stabilization points) and high velocity primary air flow to achieve efficient smoke free combustion in a shorter axial length.

Engine manufacturers are continually searching for methods and means whereby relatively compact gas turbine power plants having high thrust-to-weight ratios can be built more efficiently and more economically. A major problem in the production of such gas turbine engines is to provide an engine which is shorter in length and lighter in weight than previously produced engines without sacrificing performance or engine life. The production of such an engine would provide a number of basic advantages. The most obvious advantage would be the reduction in the overall weight of the engine with an accompanying ability of an aircraft powered by such an engine to carry a greater payload. In addition, such an engine might require fewer main bearings and, in this respect, would be even lighter, less complicated and less costly than present day engines.

Gas turbine engines of the type generally referred to here normally comprise a compressor, a primary combustion system, a turbine, a tail pipe (possibly including an augmenter combustion system), and a variable area exhaust nozzle. They may also be equipped with a fan and low pressure turbine. Conventionally, air enters an inlet and is compressed within a compressor, ignited along with hydrocarbon fuel in the primary combustion system, performs work while expanding through the turbine, and exits through the variable area nozzle. The high energy associated with the gas exiting from the exhaust nozzle provides forward thrust to an aircraft powered by such an engine.

While engine manufacturers continually work on new designs in attempts to shorten each of the above mentioned sections of a gas turbine engine, one section which one would expect to be more readily capable of reduction in length would be the primary combustion system. Typical combustor systems usually include an outer casing or shell, an inner liner or flame tube and a plurality of fuel nozzles or fuel injection tubes. To provide broad operating range and high efficiency and to reduce or eliminate visible smoke emission from the engine, it is desirable to achieve what is known as a "stoichiometric" burning condition in the dome or forward portion of the combustor (primary zone). A portion of the compressor air flow is typically introduced near the point of fuel introduction to assist in the atomization of the fuel. Means to permit this air to enter the primary combustion zone near the fuel injectors may consist simply of a plurality of apertures or louvers surrounding a conventional atomizing fuel injector nozzle or it may consist of a device in which fuel and air are intermixed prior to burning. An additional portion of the compressor discharge air is then added to the primary combustion zone through additional apertures to achieve the desired stoichiometric condition.

When the desired burning condition is achieved in the primary combustion area, the temperature of the gas stream will range between 3,000° and 4,000° F. The most commonly used turbine blades, however, are incapable of withstanding such high temperatures. The temperature must therefore be brought down to within 1,800° – 2,400° F. This is normally accomplished in a typical elongated axial flow combustor by introducing dilution or cooling air into the combustion chamber downstream of the primary combustion zone, in what is called a "secondary" or "mixing" zone. Thus, the combustor operates with a fuel rich zone which is termed the primary zone and a lean or secondary zone. The combustor length is established by adding the primary zone and secondary zone lengths together.

Attempts have been made, therefore, to shorten the primary combustion zone in order to reduce the length of the combustion system and, hence, the engine. Previous attempts to reduce the primary combustion length with no change in the type of burner employed have been unsuccessful due to a deterioration in burner performance with a possible increase in smoke emission or an increase in combustor pressure loss, which, in turn, affected overall engine performance.

SUMMARY OF THE INVENTION

It is an object of this invention, therefore, to provide a smoke free combustor for a gas turbine engine having a shorter primary burning zone and, thereby, a shorter combustion system with no performance penalty.

It is a further object of this invention to provide such a combustor wherein stoichiometric burning conditions can exist.

Briefly stated, the objects of this invention are achieved by providing a combustor with a high density, i.e., greater number for same area, of fuel injection and flame stabilization points, a dome passageway which receives a much higher percent of compressor discharge air flow than in prior art combustors, and the use of high velocity air (kinetic energy) to introduce the dome flow into the primary combustion zone. Other features, which may form part of this invention, are primary baffles for supporting fuel injectors and defining flame stabilization points, secondary air passageways, a secondary baffle positioned within the combustion zone which separates the primary and secondary burner zones, and dilution air holes to provide for the flow of secondary air into the secondary zone.

DESCRIPTION OF THE DRAWINGS

While the specification concludes with a series of claims which particularly point out and distinctly claim the subject matter which applicants regard as their invention, an understanding of this invention may be gained from the following detailed description of a preferred embodiment, which is given in light of the accompanying drawings, in which:

FIG. 1 is a fragmentary axial cross-sectional view of an exemplary prior art gas turbine engine combustion apparatus;

FIG. 2 is a fragmentary axial cross-sectional view of two prior art combustion systems showing in schematic form the mixing patterns thereof;

FIG. 3 is a fragmentary axial cross-sectional view of a combustion system showing schematically the concept of the present invention and the mixing pattern generated thereby;

FIG. 4 is a fragmentary axial cross-sectional view of an exemplary gas turbine engine combustion apparatus constructed in accordance with the provisions of the present invention; and FIG. 5 is a cross-sectional view taken along lines 5—5 of FIG. 4.

DESCRIPTION OF A PREFERRED EMBODIMENT

Referring now to the drawings wherein like numerals correspond to like elements throughout, attention is drawn to FIG. 1 wherein a continuous burning combustion apparatus of a type suitable for use in a gas turbine engine has been shown generally at 10 as comprising a hollow body 12 defining a combustion chamber 14 therein. The hollow body 12 includes a domed upstream closure member 16, having an opening 18 located centrally thereof for receiving fuel or a fuel/air mixture.

The domed closure member 16 defines the upstream end of the combustion chamber 14 and may be suitably secured to or formed integrally with the hollow body 12. As will be understood by those skilled in the art, the combustion chamber 14 may be of annular type, the cannular type, or the cellular type, with the domed closure member 16 having a single or plurality of circumferentially spaced openings 18.

An outer shell 20 is normally provided to enclose the hollow body 12 and to cooperate therewith to form passageways 22 and 24 surrounding the hollow body 12. An upstream extension 26 of the hollow body 12 cooperates with the outer shell 20 to form the inlets of the passageways 22 and 24. As will be understood, the passageways 22 and 24 are adapted to deliver a flow of pressurized air from a suitable source, such as a compressor 28, into the combustion chamber 14 through suitable apertures 29 or cooling slots 30. In this manner, the passageways 22 and 24 act to both cool the hollow body 12 and to provide dilution air to the gaseous products of combustion formed within the combustion chamber 14.

The upstream extension 26 of the hollow body 12 is adapted to function as a flow splitter to divide the pressurized air delivered from the compressor between the passageways 22 and 24 and an upstream end opening 32 centrally formed within the extension 26. As clearly shown in FIG. 1, the opening 32 communicates with a diffusion chamber or passage 34 which is defined by the internal wall of the extension 26 and the external wall of the domed member 16.

Located within the diffusion passage 34 and attached to the domed member 16 in any suitable manner known in the art is an atomizing or vaporizing fuel injection apparatus 36, which provides an atomized spray of fuel or carbureted mixture of fuel and air to the combustion chamber 14 through an outlet 38 positioned within opening 18. The fuel injection apparatus 36 may consist of a conventional atomizing spray nozzle, as shown, or it may consist of a carbureting type atomizer which provides a vortical spray of fuel and air to the combustion chamber 14. In either case, suitable fuel delivery means 40 are provided to deliver fuel to the fuel injection apparatus 36. The fuel delivery means 40 may comprise a conduit 42, which extends through the outer shell 20 and communicates with a source of pressurized fuel (not shown). The fuel delivered to the combustion chamber 14 by the fuel delivery means 40 as ignited by means of an igniter 44 located in a primary combustion zone, designated generally 46, located at the upstream end of the combustion chamber 14. The high energy gas stream thus generated thereafter flows through a secondary combustion zone 48 located downstream of the primary zone 46.

In the primary combustion zone 46, cooling air flows from the passageways 22 and 24 through the cooling slots 30 into the combustion zone. Air may also be introduced into the primary zone through the apertures 29 to assist in the attainment of stoichiometric mixture. Dilution air flows through dilution holes 50 located in the hollow body 12 into the secondary combustion zone 48. As previously discussed, air flow through cooling slots 30 acts to cool the walls of the hollow body 12, while air flow through the dilution holes 50 acts to reduce the overall temperature of the hot gas stream to a level which is capable of being withstood by a turbine located downstream of the combustion apparatus 10.

As can be seen from FIG. 1, the primary combustion zone 46 and the secondary combustion zone 48 of the prior art combustion apparatus 10 are approximately equal in axial length. The relatively long length of the primary combustion zone 46 is necessitated by a desire to stabilize the flame in a gross vortex and further by a desire to achieve stoichiometric burning conditions as closely as possible. The relatively long length of the secondary combustion zone 48 is necessitated by a desire to provide a uniform temperature pattern to the turbine.

Referring briefly to FIG. 2, the development of the high fuel injection-baffle density concept of the present invention is schematically shown by means of a comparison with two prior art combustion apparatus. In the conventional system previously described in connection with FIG. 1, and as further shown schematically in FIG. 2a, the air flow in the primary zone is a relatively small percentage of the total air flow and the combustion reaction takes place in a fuel rich (high fuel/air ratio) zone immediately downstream of the fuel injectors 36. The dilution flow is introduced downstream of this fuel rich zone to reduce the temperature level to a value which is acceptable to the turbine. In such a device, mixing takes place in almost a purely axial direction.

As shown in FIG. 2b, another prior art apparatus replaces the upstream dome member 16 of FIG. 2a with a flat plate baffle 54 which supports the fuel injection apparatus 36. Such an apparatus is shown in U.S. patent No. 2,867,982 — Clarke et al. In a system such as that shown in FIG. 2b, the vicinity immediately downstream of the fuel injection point is also fuel rich. However, at the lip of the baffle 54, pure air is introduced into the combustion zone through the upstream opening 32. Consequently, the mixing from rich to lean takes place in a generally radial direction rather than in the axial direction. Such mixing is shown schematically by the arrows 55. Again in this type of design, final trimming of the temperature is achieved with dilution air through dilution holes located in the secondary zone. This baffle concept by itself, however, does not result in a significant reduction in overall combustor length as compared to the conventional system shown in FIG. 2a.

Referring now to FIG. 3, the basic concept of the present invention is shown schematically in that the combustor is provided with a plurality of baffles 54' and a like number of fuel injection points 56. Here again, the reaction takes place in the fuel rich area immediately downstream of the baffles 54'. The fuel/air ratio again becomes leaner in the radial direction. In the case of a combustor constructed as shown in FIG. 3, however, a great deal of intermixing occurs and the reaction zone is broken up into a plurality of smaller reaction zones. Also, a primary air passage 58 is sized so as to provide a much larger percentage of primary air flow directly to the reaction zones around the baffles 54' than is provided in either of the prior art designs shown in FIGS. 2a or 2b. The overall result of the present development, as shown schematically in FIG. 3, is a burner which is approximately 40 percent shorter in length than those shown in FIGS. 2a and 2b.

While the overall concept of the present invention has been shown schematically in FIG. 3, attention is now directed to FIGS. 4 and 5 for a detailed description of the apparatus of the present invention. As shown therein, a continuous burning annular combustion apparatus 60 constructed in accordance with the provisions of the present invention generally comprises a hollow body 62 defining a combustion chamber 64 therein. The hollow body 62 includes a primary baffle or flame stabilizer 66, having a plurality of openings 68 for receiving a like number of fuel nozzles or other fuel or fuel/air atomizing devices 70. An outer shell 72 may be provided to enclose the hollow body 62 and to cooperate therewith to form passageways 74 and 76 surrounding the hollow body 62. An upstream extension 78 of the hollow body 62 cooperates with the outer shell 72 to form the inlets of the passageways 74 and 76.

The free ends of the upstream extension 78 are rigidly mounted to the outer shell 72 by means of a plurality of small vanes 80 and 82, circumferentially spaced around the passageways 74 and 76, respectively. In addition to providing a rigid connection, the vanes 80 and 82 serve to control the inlet area of the passageways 74 and 76. As is generally well-known, passageways 74 and 76 are adapted to deliver a flow of pressurized air from a suitable source, such as a compressor 84, into the combustion chamber 64 through suitable cooling slots 86 formed in the inner body 62. In this manner, the passageways 74 and 76 act to both cool the hollow body 62 and to provide dilution air to the gaseous products of combustion formed within combustion chamber 64.

The upstream extension 78 of the hollow body 62 is adapted to function as a flow splitter to divide the pressurized air delivered from a diffuser passage 88 located downstream of the compressor 84. The extension 78 divides the flow between the passageways 74 and 76 and a dome passageway 90 formed between the passageways 74 and 76. As is clearly shown in FIG. 4, the dome passageway 90 communicates with a chamber 92, which is defined by the internal wall of the extension 78 and the upstream side of the primary baffle 66. Contrary to prior art combustors, the dome passage 90 is sized to receive a major percentage of the air flow from the diffuser passage 88, i.e., greater than 50 percent of the air flow. In this manner sufficient oxygen is made available in the primary burning zone to complete reaction in a shorter length. The primary air stream is introduced with a relatively high pressure drop across the primary baffles to promote a high degree of turbulence to provide stability and to eliminate smoke.

Referring now to FIG. 5, a section of the primary baffle 66 is shown as viewed from the combustion chamber 64 looking upstream. As shown, the primary baffle 66 is comprised of two flat plate members, outer member 94 and inner member 96, but it should be understood that in certain applications the baffle 66 could be formed as a single piece, or in segments, or it could also consist of segments having a conical, concave or convex shape. The outer member 94 comprises a circumferential band 98 having a plurality of projections 99 which extend radially inwardly and which equal in number one half of the number of fuel injection points or nozzles 70. The inner member 96 also comprises a circumferential ring, labeled 100, which includes a plurality of small baffles 102 equal in number to the number of radial projections 99. As shown in FIG. 5, the members 94 and 96 are positioned such that the radial projections 99 are partially overlapped by the small baffles 102. The radial projections 99 and the small baffles 102 are thus capable of sliding movement relative to each other, and any stress which might be developed due to differential thermal expansion of the members 94 and 96 is eliminated. In some applications, the outer baffle 94 and inner baffle 96 may be formed in individual pieces (one per injector) with overlapping means for differential expansion between them. The circumferential ring 94 includes a plurality of apertures 104, which receive the discharge of one half of the fuel injectors 70. Likewise, the inner baffle 96 includes a plurality of apertures 106 for receiving the remaining fuel injectors 70. As shown in FIG. 4 the outer member 94 and inner member 96 are rigidly connected to the hollow body 62 by means of a plurality of members 108 circumferentially spaced therearound.

Referring once again to FIG. 5, the primary baffle 66 and the hollow body 62 cooperate to form a flow area 112, which is shown in cross hatch for clarity. The flow area 112 permits communication between the chamber 92 (and thus the dome passage 90) and the combustion zone 64. Thus, that portion of the compressor discharge air which enters the dome passage 90 flows through the flow area 112 and into the combustion zone 64.

The combustion zone 64 is divided into a primary combustion region 114 and a secondary region 116 by means of secondary baffles 118 and 120, which are continuous rings mounted around the hollow body 62 as shown in FIG. 4. The primary burning region 114 is provided with one or more conventional igniters 121, which provide ignition to the fuel/air mixture generated by the fuel injector 70 and baffle 66.

Additional dilution air may be introduced into the secondary burning region 116 through a plurality of thimbled dilution holes 122 located in the hollow body 62 downstream of the secondary baffles 118 and 120. Downstream of the dilution holes 122 the hollow body 62 is provided with seals 124 to control the leakage air flow along the walls of the hollow body 62 while permitting free axial differential expansion of the combustor 60. It is also possible to mount the hollow body rigidly to the turbine nozzle (not shown) and provide expansion means at the forward end.

In operation, air is delivered from the compressor 84 of a typical gas turbine engine into the combustor diffuser passage 88 where the gas stream is divided into the outer secondary passage 74, the primary passage 90 and the inner secondary passage 76. As previously mentioned, the area ratio of the primary passageway 90 to that of the secondary air passageways 74 and 76 is designed so that the relatively high Mach number air stream delivered from the compressor 84 is reduced in velocity before introduction into the primary combustion zone 114 through the flow area 112. In other words, the primary or dome passageway 90 is sized so that more than 50 percent of the air flow leaving the compressor 84 flows therethrough into the chamber 92, from whence it flows through the flow area 112 into the primary combustion zone 114. Fuel is introduced from a pair of manifolds 128 into the fuel injectors 70 from which an atomized fuel or fuel air mixture is introduced into the primary combustion zone 114.

This fuel/air spray is then ignited by means of the igniter 121. The high energy gas stream thus generated flows downstream through the combustor 60 to drive a turbine (not shown) located downstream thereof and is later expanded through an exhaust nozzle to provide thrust as is generally known in the art.

Cooling air from the secondary passageways 74 and 76 flows along the walls of the hollow body 62 and enters the primary and secondary burning zones through the cooling slots 86 to cool the walls of the hollow body 62. The generally cooler air flowing along the inside of the walls of the hollow body 62 in the primary burning region 114 is caused to mix with the hot gas stream in the center of the combustor by means of the secondary baffles 118 and 120 which turn this cooler air flow generally radially inwardly. The remainder of the cooling air flowing through the passageways 74 and 76 enters the secondary burning zone through the dilution holes 122 to reduce the temperature of the high energy gas stream to a level which the turbine is capable of withstanding.

As previously mentioned, the primary object of the present invention is to provide a shorter and more efficient smoke free combustor for a gas turbine engine. Applicants have done so by combining a number of novel features, some of which are as follows: the combustor 60 shown in FIGS. 4 and 5 incorporates a high fuel injection point and baffle density as compared to prior art devices. As shown in FIGS. 4 and 5, the primary baffle 66, in combination with the fuel injectors 70, breaks the primary combustion zone 114 up into a large number of small reaction zones. It has been demonstrated that the use of such small reaction zones provides a shorter flame than is encountered with fewer injection stabilization points. In addition, the introduction of more than 50 percent of the compressor air flow into dome passage 90 provides sufficient oxygen in the primary burning zone 114 to complete the reaction in a short length and eliminates smoke in the engine exhaust. Finally, the use of kinetic energy or velocity head to introduce the dome flow (i.e., the flow through the flow area 112 is at a much higher velocity than that normally associated with a conventional burner) gives a greater dome pressure drop than conventional systems and provides more energy in the reaction stream for flame stabilization. The results of combining the above features is a burner which is approximately 40 percent shorter in length than a conventional burner.

While the concepts of the present invention have been described in connection with an annular combustor, it should be readily apparent that the concepts are likely applicable to other forms of combustor systems, i.e., cannular, cellular, etc. For this reason, the appended claims are intended to cover all such modifications as fall within the scope of the present invention.

We claim:

1. Combustion apparatus for a gas turbine engine, said apparatus comprising:
   coaxially spaced casing and core structure forming an annular air supply passage,
   a hollow body positioned within said supply passage defining a combustion chamber therein,
   said hollow body including an upstream portion forming primary and secondary air passages communicating with said supply passage and with said combustion chamber,
   means for providing a fuel/air mixture to said combustion chamber,
   baffle means transversely positioned within said primary air passage and forming the upstream end of said combustion chamber,
   said baffle means forming at least two radially spaced rows of fuel injection points for said fuel/air mixture providing means, said baffle means further providing a plurality of openings through which primary air enters said combustion chamber, said openings surrounding each of said fuel injection points such that the combustion zone is broken up into a plurality of small reaction zones, and said primary air passage having a dimension such that a major portion of the air flow from said supply passage flows therethrough, whereby the velocity of the air flowing over said baffle means is sufficient to cause mixing of said fuel/air mixture to occur in a short axial length zone, and the volume of said primary air flow is sufficient to provide adequate oxygen in the shortened combustion zone to complete the reaction within the shortened zone and to substantially eliminate smoke from the engine exhaust.

2. Combustion apparatus as recited in claim 1 wherein said primary air passage is dimensioned such that greater than 50 percent of the air flow from said supply passage flows therethrough.

3. Combustion apparatus as recited in claim 1 wherein said baffle means comprises an outer circumferential band having a plurality of projections extending radially inwardly therefrom, and an inner member including a plurality of small baffles equal in number to the number of said radial projections.

4. Combustion apparatus as recited in claim 3 wherein said baffle means supports said fuel/air mixture providing means.

5. Combustion apparatus as recited in claim 4 wherein each of said radial projections and each of said small baffles includes an aperture located approximately centrally thereof.

6. Combustion apparatus as recited in claim 5 wherein each of said apertures comprises a fuel injection point.

7. Combustion apparatus as recited in claim 6 wherein said fuel/air mixture providing means comprises a plurality of atomizing fuel nozzles.

8. Combustion apparatus as recited in claim 6 wherein said fuel/air mixture providing means comprises a plurality of swirl vaporizing cups.

* * * * *